United States Patent [19]

Higuchi et al.

[11] Patent Number: 4,613,920
[45] Date of Patent: Sep. 23, 1986

[54] MAGNETIC HEAD FOR MAGNETIC DISK

[75] Inventors: Shigemitsu Higuchi, Yokohama; Kazutoshi Konno, Yokosuka; Tohru Sampei, Kanagawa, all of Japan

[73] Assignee: Hitachi, Ltd., Tokyo, Japan

[21] Appl. No.: 502,269

[22] Filed: Jun. 8, 1983

[30] Foreign Application Priority Data

Jun. 9, 1982 [JP] Japan ................................ 57-97635

[51] Int. Cl.$^4$ .......................... G11B 5/265; G11B 5/29
[52] U.S. Cl. ..................................... 360/121; 360/118; 360/122
[58] Field of Search ............... 360/121, 118, 119, 120, 360/122; 29/603

[56] References Cited

U.S. PATENT DOCUMENTS

| 3,557,445 | 1/1971 | Mizrahi | 360/127 X |
| 3,668,332 | 6/1972 | Anderson | 360/121 |
| 3,684,841 | 8/1972 | Boehme | 360/121 |
| 3,961,374 | 6/1976 | Murata et al. | 360/118 |
| 4,423,550 | 1/1984 | Fujioka et al. | 360/121 |

FOREIGN PATENT DOCUMENTS

| 0039090 | 4/1981 | European Pat. Off. . |
| 53-58218 | 5/1978 | Japan . |
| 2098378 | 11/1982 | United Kingdom . |

Primary Examiner—John H. Wolff
Assistant Examiner—Andrew L. Sniezek
Attorney, Agent, or Firm—Antonelli, Terry & Wands

[57] ABSTRACT

A magnetic head suitable for use in a magnetic disk. In a magnetic head in accordance with the present invention, a read/write head and an erase head are placed side by side in the rotation direction of the magnetic disk. A gap in the read/write head is placed at a distance of l from a pair of gaps in the erase head. In addition, the read/write gap in the read/write head is deviated by a distance L in the external circumference direction with respect to a pair of erase gaps in the erase head.

8 Claims, 12 Drawing Figures

RUNNING DIRECTION
OF MAGNETIC DISC

RUNNING DIRECTION
OF MAGNETIC DISC

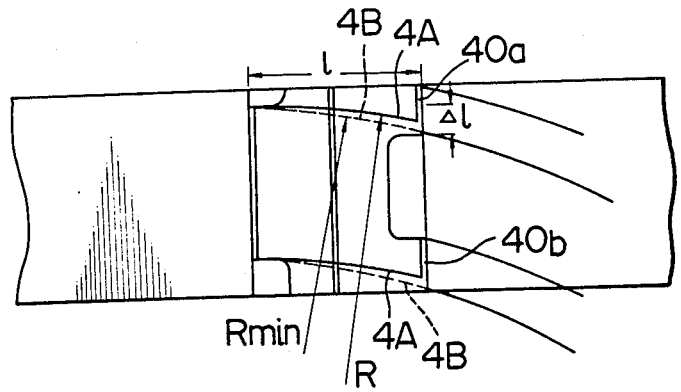
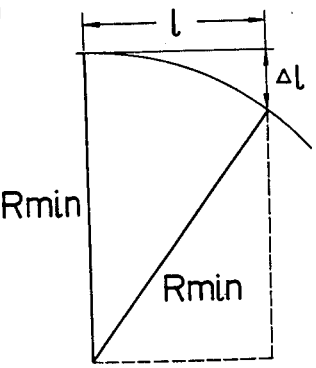
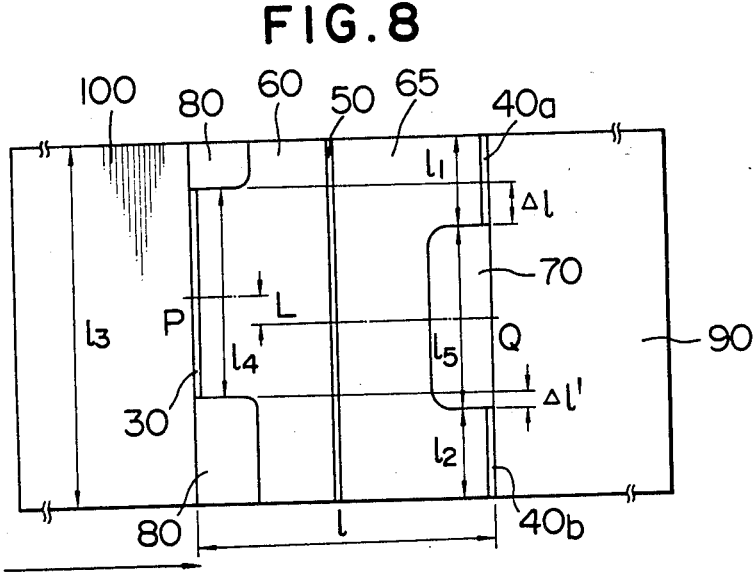

RUNNING DIRECTION
OF MAGNETIC DISC

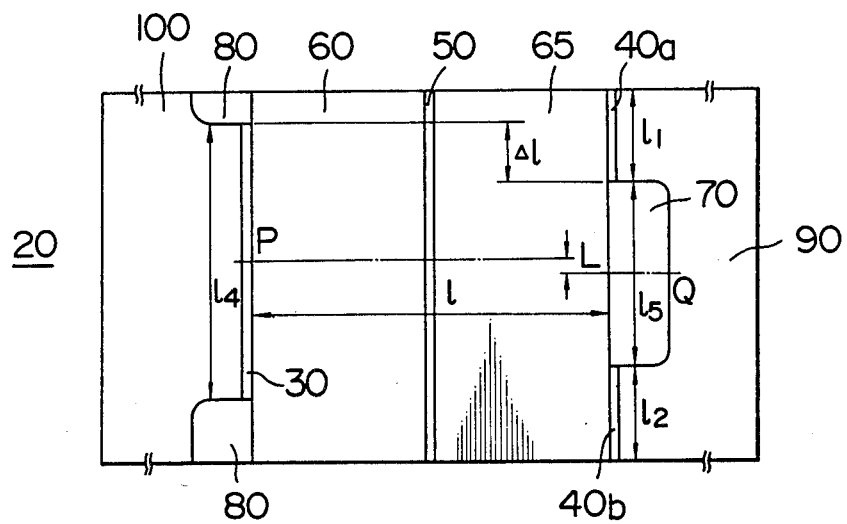
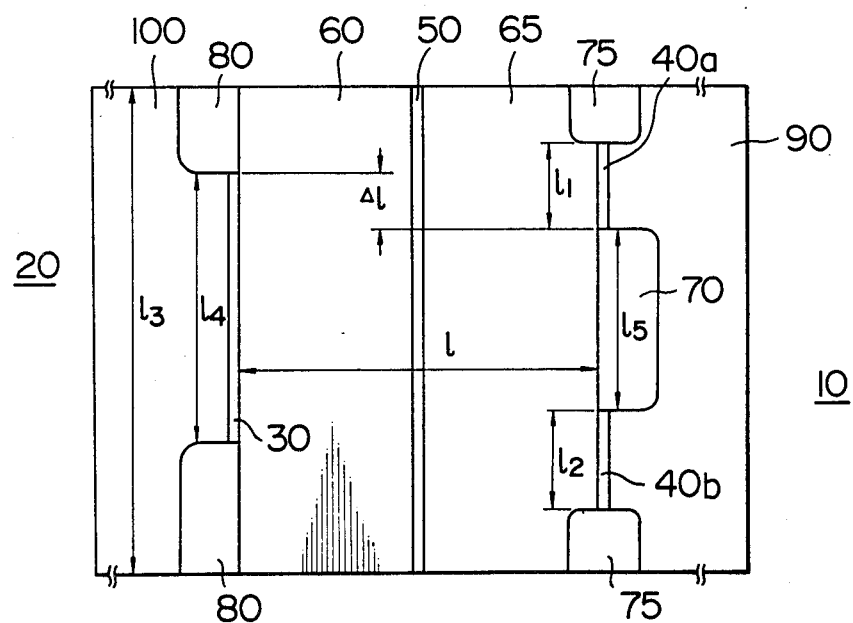

MAGNETIC HEAD FOR MAGNETIC DISK

The present invention relates to a magnetic head for recording signals onto a magnetic disk or for reproducing signals which have been recorded on the magnetic disk.

In a magnetic disk drive unit, i.e., a unit for recording signals onto a magnetic disk, especially onto a flexible magnetic disk or for reproducing signals which have been recorded on the flexible magnetic disk, a magnetic head is used. FIG. 1 shows a magnetic head according to the prior art. A magnetic head 1 comprises a read/write head chip 20 having a gap 30 and erase head chips 10 and 10 which are placed on both sides of the head chip 20 and have gaps 40 and 40. The head chip 20 is composed of magnetic cores 21, 22 and 23. The head chip 10 is composed of magnetic cores 11, 12 and 13. A coil 24 is mounted on the magnetic core 21 and a coil 14 is mounted on the magnetic core 14. Magnetic cores 11, 12, 13, 21, 22 and 23 are usually made of ferrite. The above described gap 30 is formed between the magnetic core 21 and the magnetic core 23. The gap 40 is formed between the magnetic core 11 and the magnetic core 13. On both sides of the magnetic core 20, spacers 15 and 15 made of ceramics are placed. Also between the magnetic cores 11 and 11, a spacer 25 is placed. On the outside of the head chips 10 and 10, sliders 2 and 3 made of ceramics are so arranged that the head chips 10 and 10 will get into between those sliders. The sliders 2 and 3 protect the head chips 10, 10 and 20 from destruction and guide the head chips 10, 10 and 20 so that they may properly come in contact with the magnetic disk. In FIG. 1, a portion of the slider 3 is notched.

FIG. 2 exaggeratingly shows the principal part of the magnetic head and a pattern of a magnetic track formed on the magnetic disk. Since the magnetic disk (not illustrated) is rotating, the magnetic track 4 is formed in a ring shape on the magnetic disk. On the other hand, the head chips 10 and 10 as well as the head chip 20 are formed side by side and in parallel with each other as shown in FIG. 1. These points should be noted. The magnetic disk is rotated in the A direction as indicated by an arrow. By means of the magnetic flux generated in the read/write gap 30, signals which have been recorded on a track 8 are erased and the new track 4 is formed. By means of the magnetic flux generated in the erase gap 40, guard bands 6 and 7 are formed on both sides of the track 4. Since the magnetic track 4 is formed in a ring shape and the head chips 10, 10 and 20 are placed in parallel with each other, a track 5 having a width r is formed between the magnetic track 4 and the guard band 6. It is desirable to properly position the gap 30 above the old magnetic track 8 to completely erase signals which have been recorded on the old magnetic track 8 and form the new magnetic track 4. If the gap 30 is positioned in the more inner side as compared with the old magnetic track 8, it is a matter of course that a portion of signals which have been recorded on the old magnetic track 8 is not completely erased by the gap 30. In addition, it is not erased even by the magnetic flux generated in the gap 40 since the track 5 necessarily exists. As a result, a portion of the old track 8 remains in parallel with the track 4. They are integrated, forming the new track 4. Accordingly, the S/N ratio (signal to noise ratio) of the signal which has been recorded on the track 4 is lowered. Miniaturization of a magnetic disk, especially a flexible magnetic disk is advanced year by year. As a small-sized magnetic disk is employed, it becomes impossible to neglect the width r of the track 5. If the magnetic track 5 exists, the signals which have been recorded on the newly formed magnetic track 4 are not correctly reproduced, resulting in a lowered data reliability. It becomes possible to some extent to prevent occurrence of the track 5 by holding the magnetic head 1 with a gradient. By doing this, however, the so-called azimuth angle is brought about, the frequency characteristics being deteriorated. In addition, in case a plurality of magnetic tracks are formed in the ring shape on one magnetic disk, an outer magnetic track has necessarily a radius of curvature which is different from that of an inner magnetic track. Accordingly, the width of the track which remains unerased is varied. In this case, it is impossible to completely prevent occurrence of the track 5 by means of the magnetic head thus arranged with a gradient.

An object of the present invention is to provide a magnetic head for a magnetic disk wherein there hardly remain unerased portions of the old magnetic track and a guard band can be formed adjacent to both sides of that magnetic track, especially even for a magnegic head wherein a read/write gap is placed apart from two erase gaps.

In accordance with the present invention, two erase gaps are formed as one body by using one erase head chip. Further, the erase head chip and a read/write head chip are placed one after another in the longitudinal direction instead of the lateral direction. In addition, the read/write head chip is placed with a slip in the lateral direction as compared with the erase chip formed as one body. That is to say, they are off-centered with respect to each other. The length of the erase gap is chosen so that a portion of the erase gap may overlap with the read/write gap. Even in case a plurality of magnetic tracks are formed in a ring shape on one magnetic disk, therefore, all of the data on each magnetic track are completely erased and the erase head effectively forms a guard band.

The above and other objects, features and advantages of the present invention will be apparent from the following detailed description of the preferred embodiments of the invention in conjunction with the accompanying drawings, in which:

FIG. 6 is a schematic drawing for exaggeratingly illustrating the magnetic head according to the present invention and magnetic tracks produced by the magnetic head according to the present invention;

FIG. 7 is a schematic drawing used for deriving an overlap width $\Delta l$ of a read/write gap and the erase gap;

FIG. 8 is a schematic drawing for exaggeratingly illustrating relative positions of a read/write head and erase heads in the second embodiment of a magnetic head according to the present invention;

FIG. 11 is a schematic drawing for exaggeratingly illustrating relative positions of a read/write head and erase heads in the fifth embodiment of a magnetic head according to the present invention; and FIG. 12 is a schematic drawings for exaggeratingly illustrating relative positions of a read/write head and erase heads in the fifth embodiment of a magnetic head according to the present invention.

Figure 1:
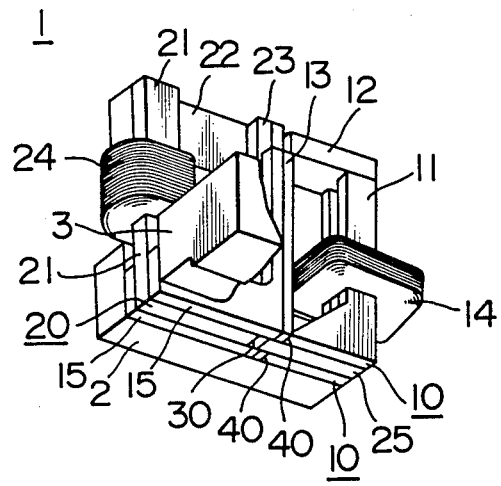
FIG. 1 is an oblique view of a magnetic head according to the prior art.
Figure 2:
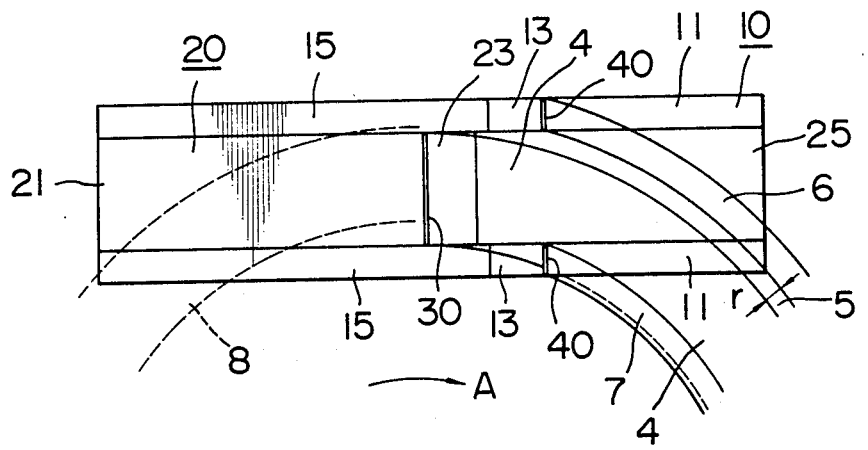
FIG. 2 is a schematic drawing for exaggeratingly illustrating relative positions of a read/write head and a pair of erase heads in a conventional prior art magnetic head and the relative positions of magnetic tracks formed by these heads.
Figure 3:
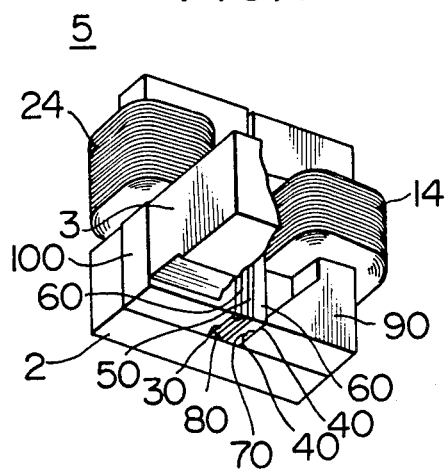
FIG. 3 is an oblique view of a magnetic head according to the present invention.
Figure 4:
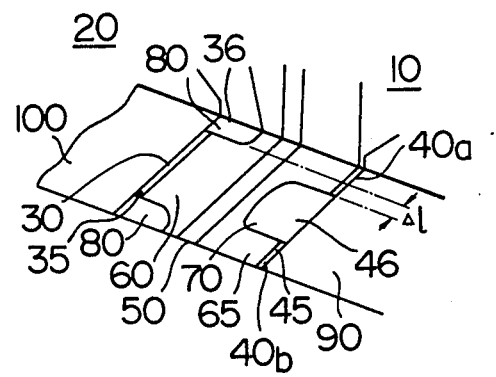
FIG. 4 is an oblique view of a principal part of the magnetic head illustrated in FIG. 3.
Figure 5:
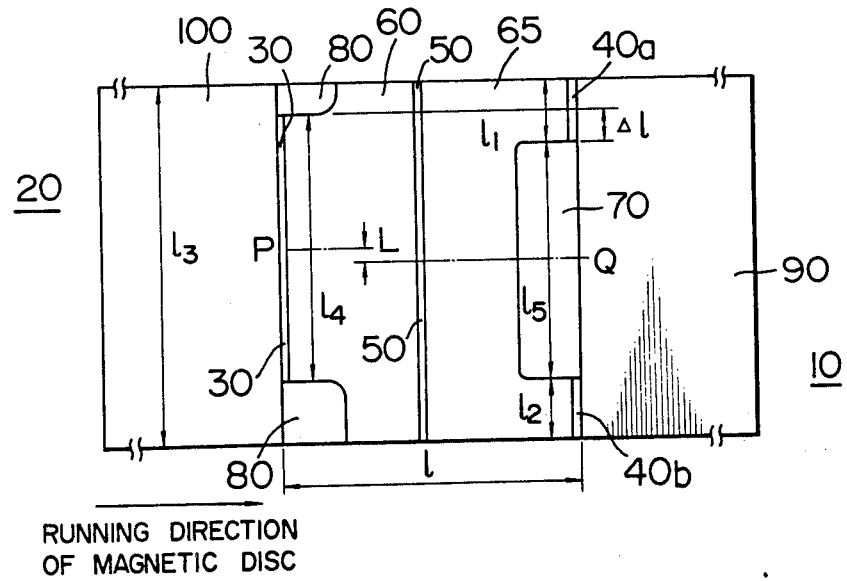
FIG. 5 is a schematic drawing for exaggeratingly illustrating relative positions of a read/write head and erase heads in the first embodiment of a magnetic head according to the present invention.

The first embodiment of a magnetic head according to the present invention will now be described referring to drawings. FIG. 3 is an oblique view of a magnetic head according to the present invention. FIG. 4 is an oblique view of the principal part of that magnetic head. FIG. 5 is a front view of the principal part of that magnetic head. A read/write head chip 20 of the magnetic head 5 according to the present invention is composed of a plate-like magnetic substance 60 with grooves 80 and 80 formed on both sides thereof, an nonmagnetic substance layer 35 for forming a gap 30, and a magnetic substance 100. The erase head chip 10 is composed of a plate-like magnetic substance 65 with a groove 70 on the central part thereof, an nonmagnetic substance layer 45 for forming gaps 40a and 40b, and a magnetic substance 90. Between the head chip 10 and the head chip 20, a plate 50 composed of a nonmagnetic substance is placed. In the same way as the nonmagnetic substance layers 35 and 45, magnetic substances are injected into the grooves 70 and 80 as well. In the magnetic head 5 according to the present invention, the erase gap 40a overlaps with the read/write gap 30 in a distance $\Delta l$. The width $l_4$ of the gap 30 is larger than the distance $l_5$ between the gap 40a and the gap 40b. The gap 40a and the gap 30a are produced by appropriately selecting positions and sizes of the grooves 70 and 80. The distance $l_5$ between the gap 40a and the gap 40b is defined to be approximatey the same value as the width of the magnetic track whereon a signal is recorded. When the density of the magnetic track has been defined to be 100 tracks/inch, the distance $l_5$ is chosen to be approximately 150 $\mu$m.

Positions of the gap 30 as well as the gaps 40a and 40b in the magnetic head according to the present invention will now be described in detail referring to FIG. 5. Values of the widths $l_1$ and $l_2$ of erase gaps 40a and 40b are determined by the positioning error of the magnetic head, the amount of expansion and contraction of the magnetic disk caused by, for example, variation of the ambient temperature and humidity, and the size error of the magnetic head itself. Usually, it is suitable to select nearly identical values for the widths $l_1$ and $l_2$ of the gaps 40a and 40b. When the above described error or the amount of expansion and contraction is large, the width $l_1$ and the width $l_2$ must be larger. If the width $l_1$ is approximately the same as the width $l_2$, the widths of two guard heads become nearly identical.

The overlap width $\Delta l$ of the gap 30 and the gap 40a must be defined in the following way. A plurality of magnetic tracks on the magnetic disk are formed in the ring shape and concentrically. Therefore, it is a matter of course that the radius of the magnetic track recorded on the most external circumference is different from that of the magnetic track recorded on the most internal circumference. FIG. 6 exaggeratingly illustrates the most external magnetic track and the most internal magnetic track. The most external magnetic track 4A represented by the solid line passes through the erase gap 40a at a position which is different from that for the most internal magnetic track 4B represented by the broken line. For completely erasing the old track, the overlap width illustrated in FIG. 5 and FIG. 6 must be larger than the difference between those positions. Assuming that the radius of the most external track, the radius of the most internal track, and the distance between the gap 30 and gap 40a or 40b are respectively $R_{max}$, $R_{min}$ and l, the overlap width $\Delta l$ is so chosen as to satisfy the following expression:

$$\Delta l \geq R_{min} - \sqrt{R_{min}^2 - l^2} . \tag{1}$$

In the first embodiment, the width $l_4$ of the gap 30 is naturally chosen with respect to the distance between the gap 40a and the gap 40b so as to satisfy the relation $l_4 > l_5$. The distance between the center P of the gap 30 and the middle point Q of the gaps 40a and 40b is L. And the distance L is represented as $$L \approx \frac{\Delta l}{2} \approx \frac{1}{2} (R_{min} - \sqrt{R_{min}^2 - l^2} ).$$

FIG. 8 shows the second embodiment of a magnetic head according to the present invention wherein the width $l_4$ of the gap 30 will be approximately equal to the distance $l_5$ between the gap 40a and the gap 40b. In addition, the width $\Delta l$ satisfies the equation (1) or (2). In this case, the width $\Delta l'$ which, as illustrated in FIG. 8, is greater than 0, is derived from the following expression (3) in the same way as FIG. 7:

$$\Delta l' \leq R_{max} - \sqrt{R_{max}^2 - l^2} \tag{3}$$

If the width $l_4$ of the gap 30 is short and $\Delta l'$ is large, the data are incompletely erased due to the gap 40b. At this time, the distance L is represented as:

$$L = \frac{1}{2} (R_{min} - \sqrt{R_{min}^2 - l^2} + R_{max} - \sqrt{R_{max}^2 - l^2} )$$

Figure 9:
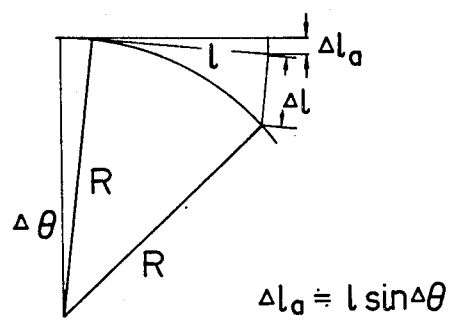
FIG. 9 is a schematic drawing used for deriving an error produced by the azimuth angle $\Delta\theta$.

In the first and second embodiments, the width $\Delta l$ and the width $\Delta l'$ have been defined assuming that the magnetic head is mounted at a proper position. In general, however, the magnetic head is not placed at a right position. The magnetic head is usually fixed with an azimuth angle $\Delta\theta$. Therefore, the error caused by this azimuth angle $\Delta\theta$ must be included in the widths $\Delta l$ and $\Delta l'$. As shown in FIG. 9, the error $\Delta la$ caused by the aximuth angle is represented as $$\Delta la \approx l \sin \Delta\theta.$$

Should an azimuth angle occur in the second embodiment, a part of data is apt to remain unerased.

Further, in the first and second embodiments, the widths $\Delta l$ and $\Delta l'$ have been derived assuming that the head chips 10 and 20 are produced with correct precision. However, it is a matter of course that errors exist in sizes of the head chips 10 and 20. Therefore, errors of sizes must also be noted.

Figure 10:
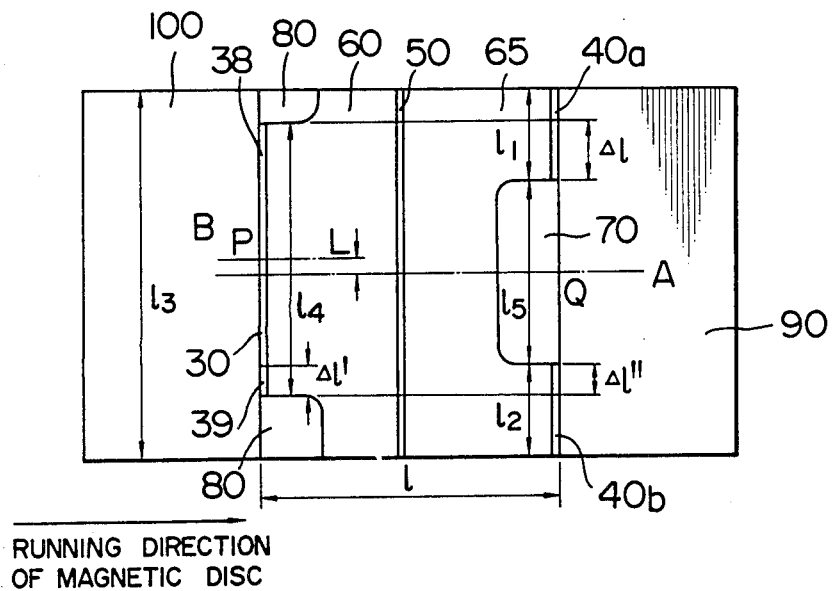
FIG. 10 is a schematic drawing for exaggeratingly illustrating relative positions of a read/write head and erase heads in the third embodiment of a magnetic head according to the present invention.

The third embodiment of a magnetic head according to the present invention will now be described referring to FIG. 10. In the third embodiment, size errors and the error due to the azimuth angle $\Delta\theta$ are taken into consideration. It is clear that the width $\Delta l$ of the overlap portion 38 which has been formed in a part of the gap 30 is represented as $$\Delta l \geq R_{min} - \sqrt{R_{min}^2 - l^2} + |l\sin(\Delta\theta)|$$

In addition, the width $\Delta l$ includes the tolerance for errors brought about in sizes. In another part of the gap 30, an overlap portion 39 having the width of $\Delta l''$ is formed. The width $\Delta l''$ is brought about a tolerance for the width $\Delta l'$ illustrated in FIG. 8 added to the tolerance for the error due to the azimuth angle $\Delta\theta$ and errors in sizes. $\Delta l''$ may appear when sum of $|l \sin (\Delta\theta)|$ and errors in sizes overcome $\Delta l'$ of FIG. 8. In this embodiment the distance L is chosen as $$L \approx R - \sqrt{R^2 - l^2} .$$

When a magnetic head having widths of erase gaps 40a and 40b $l_1=l_2=90$ μm, core width $l_3=330$ μm, distance between gaps $l=910$ μm, and deviation of the center of the gap 30 from that of gaps 40a and 40b L=15 μm is employed in a 3-inch flexible magnetic disk wherein the radius of the most external magnetic track $R_{max}=32.5$ mm and the radius of the most internal magnetic track $R_{min}=22.6$ mm under the condition that the positioning accuracy of the magnetic head (including the amount of expansion and contraction of the magnetic medium) is 40 μm and the accuracy of fitting angle for the magnetic head $\Delta\theta=(12/60)°$, there hardly remain unerased data. On the other hand, if the center of the gap 30 is not deviated from that of the gaps 30a and 30b, i.e., L=0, an unerased track having a width of approximately 20 μm appears in the most internal track. Practical use of the magnetic head according to the present invention improves the S/N by approximately 10 dB.

FIG. 11 shows the fourth embodiment of a magnetic head according to the present invention. In this embodiment, grooves 80 and 80 are formed on the magnetic substance 100 and the groove 70 is formed on the magnetic substance 90.

FIG. 12 shows the fifth embodiment of a magnetic head according to the present invention. In this embodiment, grooves 75 and 75 are formed at ends of gaps 40a and 40b on the magnetic substances 65 and 90. In this embodiment, the widths of the gap 30 as well as gaps 40a and 40b are not large. Instead, the width $l_3$ of magnetic substances 60, 65, 90 and 100 is made large. As a result, the strength of the head chips 10 and 20 is increased.

In the above described five embodiments, each drawing shows the top view of the magnetic head. For a magnetic head which is placed on the rear side of the magnetic disk, each drawing will represent the bottom view.

In the magnetic head according to the present invention as heretofore described, the read/write gap is placed in parallel to and at a distance l from a pair of erase gaps, and the mid point of the read-write gap is linearly displaced at a distance L from a mid point set up between the erase gap $l_1$ and $l_2$. When signals are recorded on a magnetic disk using a magnetic head in accordance with the present invention, unerased signals are not left. As a result, signals are correctly recorded on the magnetic track of the magnetic disk. When reading out signals through the magnetic head, only required signals are correctly read out.

What is claimed is:

1. A magnetic head for use in a drive unit for driving a magnetic disk comprising:
   an erase head which includes a first erase gap $l_1$ in width and a second erase gap $l_2$ in width placed on the extension of said first erase gap and at a distance $l_5$ therefrom; and
   a read/write head placed adjacent to said erase head, said read/write head comprising a read/write gap having a width of $l_4$ which is larger than said distance $l_5$, said read/write gap being placed in parallel to and at a distance l from said pair of erase gaps on said erase head, said read/write gap having a portion $\Delta l$ in width which overlaps said first erase gap, said width $\Delta l$ being specified as $$\Delta l \geq R_{min} - \sqrt{R_{min}^2 - l^2} ,$$

where $R_{min}$ represents the track radius of the most internal track on a magnetic disk whereon a signal is recorded by said magnetic head, a midpoint of said read/write gap being linearly displaced a distance L from a midpoint set up between said first erase gap $l_1$ and said second erase gap $l_2$.

2. A magnetic head according to claim 1, wherein the inner end of said second erase gap is displaced at a distance $\Delta l'$ from the end of read/write gap, and said distance $\Delta l'$ is specified as $$0 < \Delta l' \leq R_{max} - \sqrt{R_{max}^2 - l^2}$$

where Rmax represents the track radius of the most external track on a magnetic disc whereon a signal is recorded by said magnetic head.

3. A magnetic head according to claim 1, wherein said distance L is specified as $$L \approx R - \sqrt{R^2 - l^2} ,$$

where R represents the average track radius of a magnetic disk whereon a signal is recorded by said magnetic head.

4. A magnetic head according to claim 1, wherein said distance L is specified as $$L \approx \tfrac{1}{2} (R_{min} - \sqrt{R_{min}^2 - l^2} ),$$

where $R_{min}$ represents the track radius of the most internal track on a magnetic disk whereon a signal is recorded by said magnetic head.

5. A magnetic head for use in a drive unit for driving a magnetic disk comprising:
   an erase head having a first magnetic substance and a second magnetic substance placed adjacent to said first magnetic substance and connected thereto through a nonmagnetic substance, on the central part of at least one of said first and second magnetic substances a groove $l_5$ in width including the connecting part for said first and second magnetic substances being formed, whereby a first erase gap $l_1$ in width and a second erase gap $l_2$ in width are formed between said first magnetic substance and said second magnetic substance; and a read/write head placed adjacent to said erase head having a third magnetic substance and a fourth magnetic substance connected to said third magnetic substance through a nonmagnetic substance, second and third grooves including the connection part for said third and fourth magnetic substances being formed on both ends of at least one of said third and fourth magnetic substances, whereby a read/write gap $l_4$ in width is formed on said connection part for said third and fourth magnetic substances, said read/write gap being placed in parallel to and at a distance $l$ from said first and second erase gaps, said read/write gap having a portion $\Delta l$ in width which overlaps said first erase gap, said width $l$ being specified as $$\Delta l \geq R_{min} - \sqrt{R_{min}^2 - l^2},$$

where $R_{min}$ represents the track radius of the most internal track on a magnetic disk whereon a signal is recorded by said magnetic head, a midpoint of said read/write gap being linearly displaced a distance L from a midpoint set up between said first erase gap $l_1$ and said second erase gap $l_2$.

6. A magnetic head according to claim 5, wherein the inner end of said second erase gap is displaced at a distance $\Delta l'$ from the end of read/write gap, and said distance $\Delta l'$ is specified as $$0 < \Delta l' \leq R_{max} - \sqrt{R_{max}^2 - l^2}$$

where $R_{max}$ represents the track radius of the most external track on a magnetic disc whereon a signal is recorded by said magnetic head.

7. A magnetic head according to claim 5, wherein said distance L is specified as $$L \approx R - \sqrt{R^2 - l^2},$$

where R represents the average track radius of a magnetic disk whereon a signal is recorded by said magnetic head.

8. A magnetic head according to claim 5, wherein said distance L is specified as $$L \approx \tfrac{1}{2} (R_{min} - \sqrt{R_{min}^2 - l^2}),$$

where $R_{min}$ represents the track radius of the most internal track on a magnetic disk whereon a signal is recorded by said magnetic head.

* * * * *